April 27, 1954

A. C. BLANEY ET AL 2,676,798

FILM DRIVE FILTER

Filed April 20, 1950

INVENTORS
ARTHUR C. BLANEY
& JAMES L. PETTUS
BY
ATTORNEY

Patented Apr. 27, 1954

2,676,798

UNITED STATES PATENT OFFICE 2,676,798

FILM DRIVE FILTER

Arthur C. Blaney, Los Angeles, and James L. Pettus, Encino, Calif., assignors to Radio Corporation of America, a corporation of Delaware Application April 20, 1950, Serial No. 157,084

3 Claims. (Cl. 271—2.3)

This invention relates to film strip drive apparatus, and particularly to a constant speed drive for perforated magnetic film or tape.

In the art of sound recording, many combinations of sprockets, film-pulled drums, flywheels, resiliently mounted film loop filters, dashpots, etc., have been developed and used in the driving of photographic motion picture film on which sound is recorded. Some of these prior systems use magnetically driven drums with a soft loop on each side of the drum, and others employ tight loops between the sprocket and the film-pulled drum. Resilient spring biased rollers are generally placed in the tight loops, one of which usually has a dashpot damper associated therewith. In such photographic systems, the translation point where the light beam is impressed on the film is at the point where the film is supported by the drum.

With the advent of magnetic sound recording and reproduction, using perforated magnetic film which is propelled by toothed sprockets, magnetic recording and reproducing heads are in contact with the film at a point or points spaced from the drum. In some instances, several such heads are positioned transversely of the magnetic film in order to record and reproduce several parallel tracks. Magnetic damping of the drum is not desirable in magnetic sound systems, because stray magnetic fields introduce noise in the recording. Furthermore, the use of a pair of tensioned rollers in the two film loops between the sprocket and film-pulled drum, one roller being damped by a dashpot, does not provide sufficient uniformity of motion of the film at the point of contact, which is usually immediately after the film leaves the drum. To overcome the variation in speed at this point, the present film filter described hereinafter was developed. The new filter utilizes a third tensioned roller at a critical position in the film path between the sprocket and drum, the third roller having a specific relationship to the other rollers from the tension standpoint.

The principal object of the invention, therefore, is to facilitate the obtaining of uniform film motion past a magnetic head or heads.

Another object of the invention is to provide an improved uniform speed film drive for magnetizable film.

A further object of the invention is to provide a magnetizable film drive which drives the film uniformly as it passes a magnetic head.

A still further object of the invention is to provide a multiple track magnetic recorder and film reproducer, which provides uniform motion of the film past a plurality of heads transversely of the film, and provides uniform contact of the film with all the heads.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
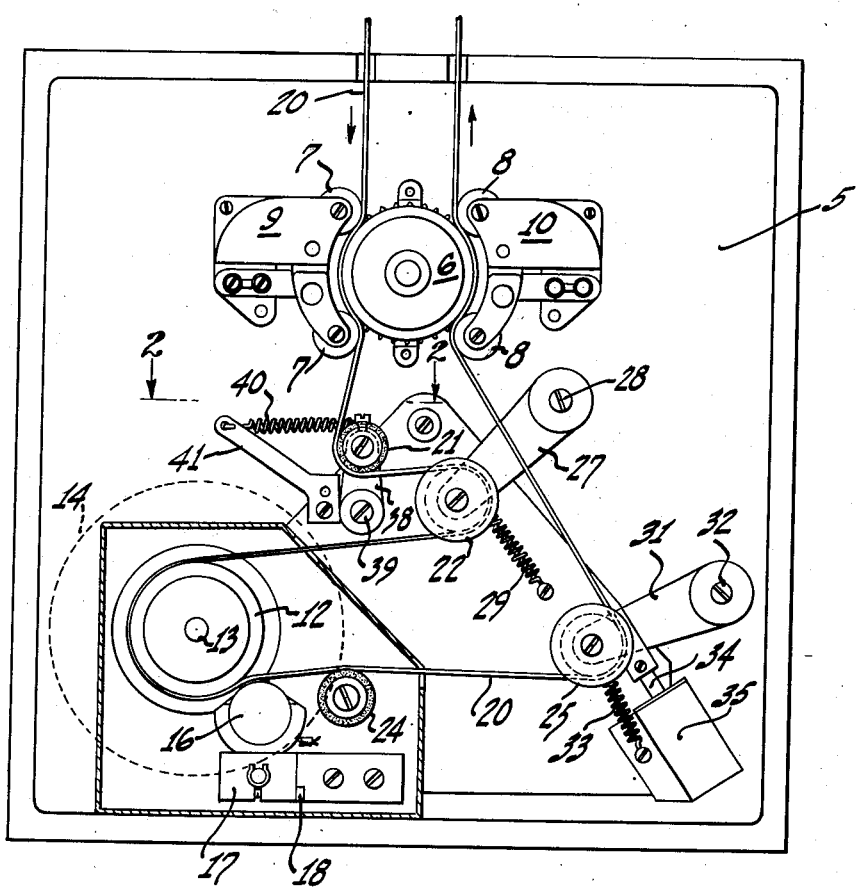
Fig. 1 is an elevational view of the film drive embodying the invention.
Figure 2:
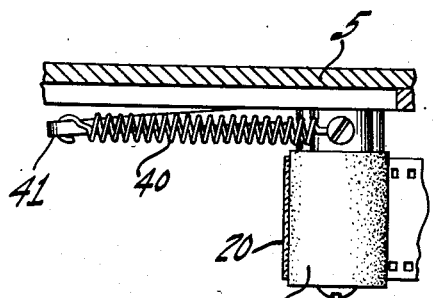
Fig. 2 is a detailed view of one of the film filter rollers, taken along the line 2—2 of Fig. 1.

Referring now to the drawings, in which the same numerals identify like elements, a film recorder consists of a mounting plate 5, on the front of which is a drive sprocket 6 having two pairs of pad rollers 7—7 and 8—8 mounted on mechanisms 9 and 10, respectively, for adjusting the rollers toward and away from the sprocket 6. Also mounted on the plate 5, is a film-pulled drum 12 having a shaft 13, on the other end of which is mounted the usual type of solid flywheel indicated by the dotted lines 14. For recording and reproducing a plurality of magnetic tracks, a plurality of magnetic record-reproduce heads are mounted in line transversely of the film, the end view of one head being shown at 16. The details of these heads are shown in copending U. S. application, Ser. No. 151,567, filed March 24, 1950, now Patent No. 2,628,286. The heads are mounted on a mounting block 17 and are provided with adjustable screws 18 for properly aligning the heads with the film.

In Fig. 1, a film 20 is shown passing downwardly over the left-hand side of sprocket 6, around tension roller 21, around a second tension roller 22, around the drum 12, over the heads 16, over a fixed direction guiding roller 24, around a tensioning roller 25, and back to the right-hand side of sprocket 6. Fixed roller 24 is for the purpose of giving the film 20 the proper angle as it passes over the curved cores of the heads 16.

Referring now to the film tensioning rollers, the roller 22 is mounted on an arm 27, pivoted at 28, and is tensioned against the film by a coil spring 29. The roller 25 is mounted on arm 31, pivoted at 32, and is tensioned against the film by a spring 33. However, the arm 31 is connected to the piston rod 34 of a dashpot 35, which provides damping of the film loop between the roller 12 and the right-hand side of sprocket 6.

With the use of a magnetic drive or damping flywheel, such as disclosed and claimed in Kellogg U. S. Patent No. 1,892,554 of December 27, 1932, the rollers 22 and 25 are sufficient to eliminate the effect of sprocket variations, or variations in sprocket speed, or high frequency irregularities caused by the sprocket teeth as the film leaves the sprocket. As mentioned above, however, the use of such a magnetic damping arrangement is not feasible with magnetic film. However, the addition of the roller 21 in the manner shown does eliminate such speed variations so that the film has a uniform motion past the heads 16.

The roller 21 is of graphite-filled nylon, and thus, self-lubricating. It is mounted on an arm 38, pivoted at 39, and tensions by a spring 40, mounted to the end of a fixed bracket 41. The entire roller mechanism is light in weight, and thus, is able to follow any rapid film variations in the film as it leaves the sprocket 6. It will be noted that the roller is mounted in the film path so that it aids, as much as possible, in maintaining the instantaneous value of film tension. The tension applied by spring 40 to the arm 38 of roller 21 causes it to move in a direction approximately 135° from that of arm 27 of roller 22. Thus, when the film suddenly advances, as it may do when leaving a sprocket tooth, each of the two rollers 21 and 22 have to move a less distance to take up the slack in the loop than if only one of them took up all the slack. Furthermore, the rollers 21 and 22 are so positioned that the tension on roller 22 is much greater than it is on roller 21, while the tension on roller 22 is comparable to that on roller 25. The tension on roller 25 is slightly greater to overcome the friction components in other parts of the tensioned loop.

It can be said that the rollers 22 and 25 maintain an average tension on the film, and the natural resonance of these roller mechanisms coupled to the inertia of the flywheel is damped out by the dashpot 35. This resonance is of very low frequency, being on the order of one or two cycles per second. The tensioning roller 21 has two functions—(1) it maintains a high instantaneous value of film tension on the drum, which prevents slippage, and permits the efficient action of the flywheel, and (2) since the mass of this roller mechanism is small and the spring tension is also small compared with the inertia of the flywheel, its effect on the flywheel is negligible, which permits it to absorb all the high frequency disturbances introduced by the feed side of the sprocket.

Another important feature is the so-called "belt action" of the film on the drum, which, in order to prevent slippage, requires a higher value of film tension ahead of the drum than following it. That is, the film is normally pulling the drum; but, if the film suddenly moves ahead on the feed side of the sprocket, the flywheel must supply retarding action if the film speed at the magnetic heads is to be maintained constant. It cannot supply this action unless the tension on the drum is maintained. As in any belt system, when the tension is removed from the feed side of the driven pulley, the belt slips. In the present invention, the tensioned arms ahead of the drum operate fast enough to take up any slack film fed in by the sprocket. On the takeup side of the drum, momentary slack film causes the drum to act as a driver pulley instead of a driven pulley, and, as in any belt system having a 180° or more wrap on the pulley, there is a strong tendency for the film to stick to the drum as long as tension is maintained on the feed side. In the present construction, the compliance of the film is enough to prevent slippage during these momentary conditions. There is enough compliance in the film to maintain good contact with the heads during these conditions.

We claim:

1. A film drive comprising a sprocket adapted to advance film at two positions thereon, a film-pulled drum, said film forming two tight loops between said drum and said sprocket, a plurality of rollers tensioned against said film in said loops, two tensioning rollers being in a first one of said loops and one tensioning roller being in the other of said loops, and means for pivoting said two rollers so that said two rollers move substantially toward and away from one another during variations in size of said film loop in which they are positioned, the roller adjacent said sprocket being lighter in weight and under less tension than the other of said two rollers.

2. A film drive comprising a sprocket adapted to advance film at two positions thereon, a film-pulled drum, said film forming two tight loops between said drum and said sprocket, a plurality of rollers tensioned against said film in said loops, two tensioning rollers being in a first one of said loops and one tensioning roller being in the other of said loops, and means for pivoting said two rollers so that said two rollers move away from one another when the loop in which they are positioned increased in size, said means for said roller adjacent said sprocket being lighter in weight than said means for the other of said two rollers.

3. A film drive filter of the tight loop type comprising a shaft, a film-pulled drum on said shaft, a flywheel on said shaft, a sprocket adapted to feed film to said drum in one loop and take film from said drum in a second loop, a tensioned roller in said second loop, a pair of rollers tensioned in substantially opposite directions in said first mentioned loop, and pivot means for each of said pair of rollers, the roller and pivot means therefor adjacent said sprocket being under less tension and of lighter weight than said other roller of said pair and the pivot means therefor.

References Cited in the file of this patent

UNITED STATES PATENTS

| Number | Name | Date |
|---|---|---|
| 1,920,789 | Heisler | Aug. 1, 1933 |
| 2,243,112 | Morrissey | May 27, 1941 |
| 2,442,400 | Collins | June 1, 1948 |
| 2,539,858 | Offutt | Jan. 30, 1951 |
| 2,586,600 | Bartelson | Feb. 19, 1952 |

FOREIGN PATENTS

| Number | Country | Date |
|---|---|---|
| 58,549 | Denmark | Mar. 31, 1941 |
| 477,943 | Great Britain | Jan. 10, 1938 |